United States Patent
Montgomery

Patent Number: 5,696,783
Date of Patent: Dec. 9, 1997

[54] LASER COOLING

[75] Inventor: John W. S. Montgomery, Stittsville, Canada

[73] Assignee: Lumonics Inc., Kanata, Canada

[21] Appl. No.: 524,831

[22] Filed: Sep. 7, 1995

[51] Int. Cl.$^6$ .................................................. H01S 3/04
[52] U.S. Cl. .................................................. 372/35
[58] Field of Search ................................ 372/35, 36

[56] References Cited

U.S. PATENT DOCUMENTS

| | | | |
|---|---|---|---|
| 3,466,566 | 9/1969 | Patel | 372/35 |
| 3,480,874 | 11/1969 | Milochevitch et al. | 372/35 |
| 3,487,330 | 12/1969 | Gudmundsen | 372/35 |
| 3,554,275 | 1/1971 | Schade | 372/35 |
| 4,649,547 | 3/1987 | Carlson et al. | 372/35 |
| 4,715,039 | 12/1987 | Miller et al. | 372/35 |
| 5,222,073 | 6/1993 | Epstein et al. | 372/35 |
| 5,353,293 | 10/1994 | Shull | 372/35 |

OTHER PUBLICATIONS

Atamas, "Methods of Cooling Solid–State Laser Rods", Scripta Technica, Inc., 1993. No Month.
Reed et al., "Conduction Cooling of Nd: Glass Slab Lasers", SPIE, vol. 736, 1987. No Month.
Reed et al., "Performance of a Conduction Cooled Nd: Glass Slab Laser", SPIE, vol. 736, 1987 No Month.
Koch, "Cull Laser with a Helical Hollow Cathode Discharge", J. Phys. E: Sci. Instrum., vol. 16, 1983. No Month.

Primary Examiner—Rodney B. Bovernick
Assistant Examiner—Robert E. Wise

[57] ABSTRACT

The cooling of the outer surface of the rod or other solid active element of a solid state laser is improved by causing coolant to travel in a plurality of, preferably streamline, helical flows extending around this surface in contact with it. The respective longitudinal components of a pair of the helical flows preferably extend in opposite directions along the surface to improve the uniformity of cooling.

15 Claims, 2 Drawing Sheets

LASER COOLING

FIELD OF THE INVENTION

This invention relates to the cooling of lasers.

In an important application, the invention is directed to the cooling of a laser having a solid active laser element, such as a diode pumped, solid state laser, and the specific examples given below relate to this type of laser.

BACKGROUND OF THE INVENTION

A typical solid state laser that generates enough power to require cooling, has an elongate lasing rod as the solid active element. The traditional way of cooling such a rod has been to pass water along the rod in contact with its external surface from one end of the rod to the other. See the book entitled *Solid-State Laser Engineering* by Walter Koechner published by Springer-Verlag, pages 346 and 347 and FIGS. 6.65 and 6.66; and also pages 373 to 379 and FIGS. 6.91 and 6.92. This longitudinal cooling arrangement has had the disadvantage that it results in non-uniform cooling of the rod, the end of the rod at which the cold water enters the system being cooled more effectively than the end of the rod at which the now-warmed water exits.

In a paper entitled "Methods of Cooling Solid-State Laser Rods" by A. V. Atamas published in Scripta Technica Inc. 1993 pages 903–912, the author explains that the optical output characteristics of such a laser are closely related to the temperature of the rod, and that the uniformity of this temperature is a highly desirable feature.

It has also proved difficult to scale up a laser cooled in this way to higher powers without still further loss of performance.

SUMMARY OF THE INVENTION

An object of the present invention is to provide a method of cooling the rod (or other solid active element, such as a slab) of a laser in a manner that improves the uniformity of cooling.

The coolant will normally be water, but the use of other liquids is not precluded, although the coolant will normally need to be transparent to the pumping light provided by the diode laser or by a lamp. Other liquids that can be used are discussed in the Koechner book referred to above, pages 414–416. Even a gaseous coolant can be used, but is usually less desirable for the reasons explained by Koechner on pages 418–419.

In its preferred form the invention provides a system in which the coolant is caused to flow transversely of the length of the laser element, rather than longitudinally along it. Initially the coolant preferably contacts the outer surface of the laser element while travelling parallel to or tangential to such surface. The coolant then travels generally circumferentially around this surface in contact with it. The coolant is constrained to flow in a jacket spaced uniformly outwardly of this outer surface of the laser element. By placing an outlet port for the coolant at a location along the jacket from an inlet port, the flow of the coolant between these ports can be caused to be helical rather than purely circumferential. M. K. Reed et al. in "Conduction Cooling of Nd: Glass Slab Lasers," published in SPIE Vol. 622 (1986) disclose cooling of a slab by the simple transverse flow of a coolant, but this flow is never helical. See also M. K. Reed et al. "Performance of a Conduction Cooled Nd: Glass Slab Laser," published in SPIE Vol. 736 (1987).

Except in the very unusual case of a very short rod, where one inlet port and one outlet port might be sufficient, the system preferably employs a plurality of both inlet and outlet ports disposed along the length of the jacket surrounding the laser element. If the ports at each end of the jacket are made the inlet ports, with one or more outlet ports alternating between them, the cooler incoming coolant contacts the two ends of the rod first and flows towards the center. This avoids one end of the surface of the laser element being subjected to a different cooling effect than the other end. Alternatively, the ports at the ends of the jacket can be outlet ports, with the inlet ports located between them. The use of multiple ports also avoids a large pressure drop.

In a typical example, there can be a first group of say eight ports of one type (inlet or outlet) spaced apart uniformly along the jacket from one end to the other, with a second group of seven ports of the other type each located longitudinally and uniformly between respective pairs of the first group. As a result the coolant will be caused to travel in a plurality of helical flows between these ports, the respective longitudinal components of these helical flows alternating in direction.

A typical solid active laser element has so far been simply described as a rod, i.e. with a circular cylindrical outer surface. It is important to stress, however, that the cross-section of this rod is not necessarily circular. Its shape in cross-section may be elliptical, or circular with flats formed on opposite sides, which is similar to being rectangular with convex ends. The invention is also applicable to slab lasers which are normally rectangular in cross section without any rounding of the corners.

A desirable feature of the present invention is to cause the coolant to flow as smoothly as possible in a substantially streamline manner. This result is easiest to achieve when the rod cross section is entirely curved (circular or elliptic) and hardest when the cross section has sharp corners, e.g. a slab laser. However, even in this latter situation, careful design of the jacket can enable the achievement of an acceptable approximation to streamline flow. Streamline flow or substantially streamline flow is desirable because it avoids or minimizes the coolant setting up vibrations in the laser element.

The shape of the cooled outer surface of the laser element can thus be defined as elongate, i.e. of greater length than its maximum transverse dimension, with a transverse cross section that is preferably substantially free of sharp corners or concave regions. The internal surface of the jacket confining the coolant will approximately mirror the outer surface of the laser element to define an elongate annular passage between the jacket and the outer surface of the element. This passage is substantially uniform in width, i.e. its radial dimension.

Hence, in its broad method aspect, the invention can be defined as a method of cooling an elongate outer surface of a solid active laser element, comprising causing coolant to travel in at least one confined helical flow in contact with said surface.

A plurality of helical flows is preferably used. These flows may have longitudinal components that extend in the same direction along the outer surface of the laser element, or at least two of such flows may have longitudinal components that extend in opposite directions along such outer surface.

The invention provides a laser having an elongate solid active element requiring cooling, and a jacket surrounding the outer surface of this element to define an elongate annular space of substantially uniform radial extent for confining the flow of the coolant in contact with the outer surface. The jacket has at least one pair of ports for respectively introducing coolant into the annular space in a direction substantially parallel to or tangential to the element surface and receiving coolant from the space in a direction substantially parallel to or tangential to the element surface. These inlet and outlet ports are displaced from each other in the longitudinal direction of the annular space in order to cause the flow of coolant between them to be helical.

The invention also relates to a jacket per se for use in such a laser.

While the concept of causing a coolant to flow in a helical path inside a hollow, helical cathode is known from H. Koch in "Cull Laser with a Helical Hollow Cathode Discharge" published in J. Phys. E: Sci. Instrum., Vol. 16, 1983, this disclosure does not relate to a solid laser element, particularly one that has an elongate outer surface (rod or slab) to which the cooling is applied from the exterior.

DETAILED DESCRIPTION OF THE PREFERRED EMBODIMENTS

Figure 1:
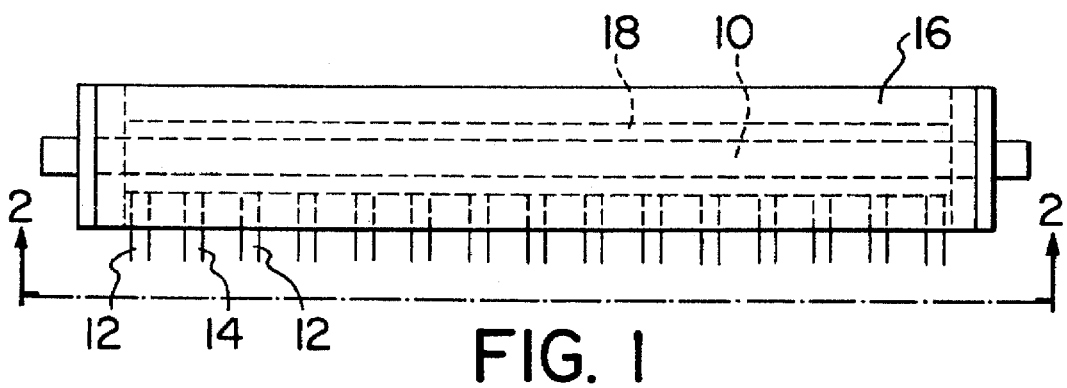
FIG. 1 is a side view of part of a solid state laser showing an embodiment of the invention.
Figure 2:
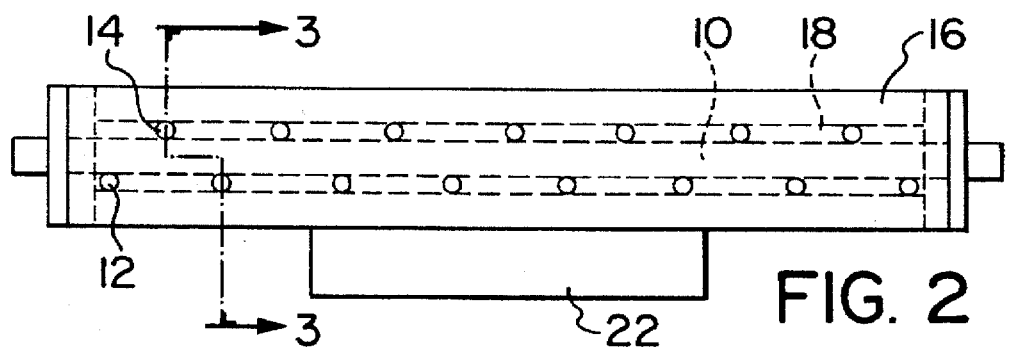
FIG. 2 is a view taken on the line 2—2 in FIG. 1 with some additional parts shown.
Figure 3:
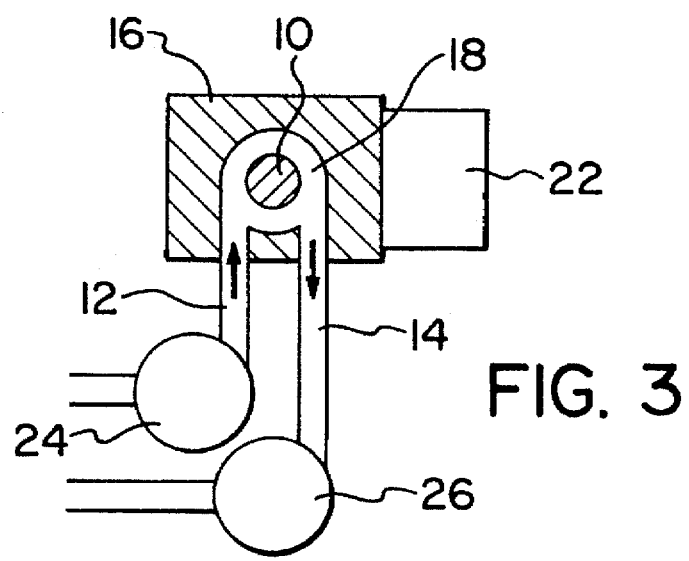
FIG. 3 is a section on a somewhat enlarged scale taken on the line 3—3 in FIG. 2.

The laser rod 10 of FIGS. 1 to 3 is cylindrical and is pumped by one or more diode lasers 22 through a transparent jacket 16. This method of pumping is conventional.

Eight inlet ports 12 of approximately 1 mm diameter each and seven outlet ports 14 of approximately 1.1 mm diameter each are uniformly and alternately disposed along the length of the jacket 16 with a separation between each adjacent pair of ports of approximately 6.9 mm. The jacket 16, together with the outer surface of the rod 10, defines a cylindrical annular space 18 for coolant flow, the radial dimension of this space 18 being kept as uniform as possible to encourage streamline flow. The rod 10 is maintained in this orientation at its two ends by support portions of the jacket, which also act to keep the space 18 fluid tight. The inlet ports 12 communicate with an inlet header 24 and the outlet ports 14 communicate with an outlet header 26. Means (not shown) will be provided for introducing coolant into the inlet header 25 and receiving it from the outlet header 26. The average flow rate will typically be 0.6 gallons per minute. The Koechner book (pages 416–418) describes various arrangements of cooling equipment. The particular management of the coolant external of the space 18 surrounding the rod 10 is not germane to the present invention, and any convenient system can be used.

Figure 4:
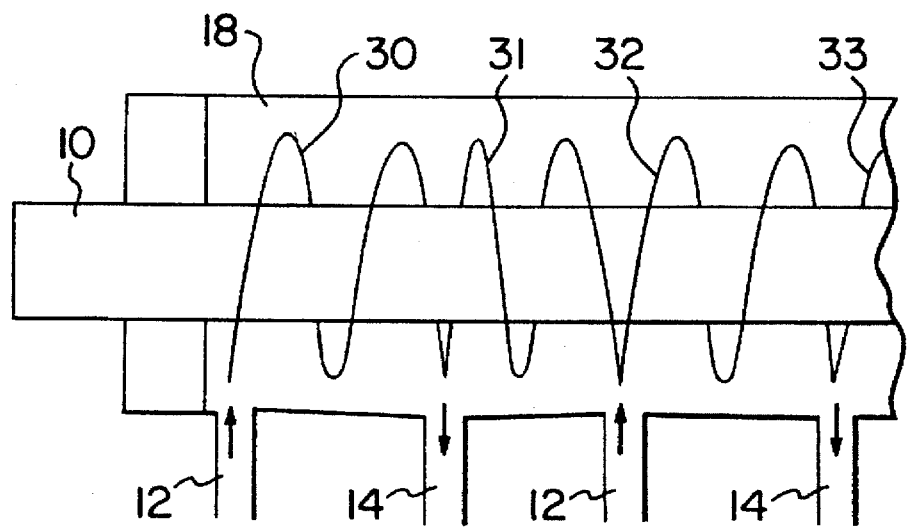
FIG. 4 is a sketch illustrating diagrammatically the operation of the apparatus of FIGS. 1–3.

FIG. 4 demonstrates with single lines 30–33 typical helical flows of the coolant. Note that the coolant entering the space 18 through the inlet port 12 second from the end of the rod 10 will flow in both longitudinal directions as shown at 31 and 32. This effect is repeated down the length of the space 18, so that, except at the two ends of the space 18, the longitudinal components of the flow are divided and alternate in direction.

Figure 5:
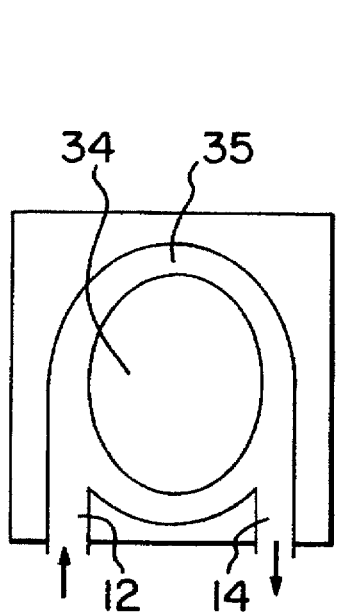
FIGS. 5 to 7 are diagrams that respectively demonstrate alternative constructions.

FIG. 5 demonstrates an elliptical laser rod 34 surrounded by a complementary elongate annular flow space 35. The embodiments of FIGS. 1–3 and 5 are preferred from the viewpoint of achieving the best approximation to streamline flow of the coolant.

Figure 6:
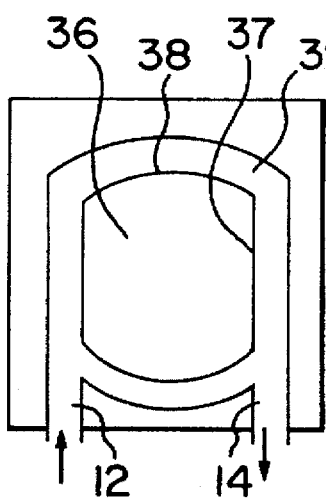

FIG. 6 shows a laser rod 36, the outer surface of which consists of flat sides 37 and convex ends 38. Again the shape of the flow space 39 has been adjusted to the shape of the rod so that the radial width of this space is as uniform as possible to minimize turbulent flow. The flat sides 37 afford improved optical properties in relation to the pumping of the laser rod.

Figure 7:
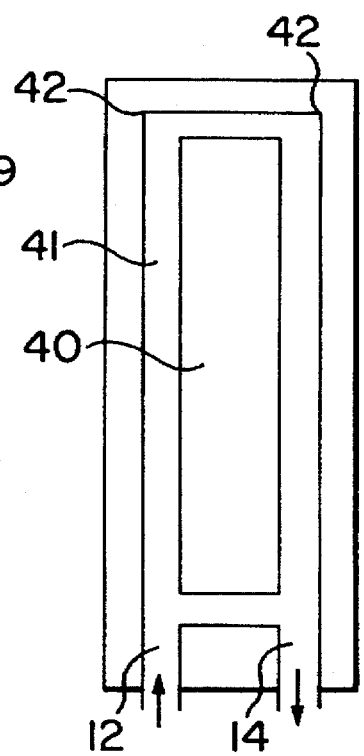

FIG. 7 shows a rectangular slab type of active laser element 40, to which the invention is also applicable, even though it is impossible to entirely eliminate the generation of some turbulence at places where the coolant turns a sharp corner. To minimize this effect the annular flow space 41 is designed to have as uniform a radial dimension as possible, and, if desired, the corners 42 can be somewhat rounded.

It should be noted that surfaces that have been described or illustrated as curved may in practice be formed from a series of short straight portions. Hence, any reference herein to a surface being curved is to be understood as including such an approximation to pure curvature resulting from the use of a series of short straight portions.

We claim:

1. A method of cooling an elongate outer surface of a solid active laser element, comprising defining an annular space of substantially uniform radial extent around the element, supplying coolant, in a direction tangential to or parallel to a part of said surface, into said space at a plurality of locations spaced apart along said surface to generate a plurality of helical flows distributed longitudinally along said space, said plurality of helical flows travelling along said surface to at least one outlet.

2. A method according to claim 1, wherein respective longitudinal components of two of the helical flows extend along said space in directions opposite to each other.

3. A method according to claim 1, wherein said flows are substantially streamline.

4. A method according to claim 1, including receiving coolant from said space at said at least one outlet in a direction tangential to or parallel to a further part of said surface.

5. A method according to claim 1, wherein said outer surface is a circular cylinder.

6. A method according to claim 1, wherein said outer surface is substantially elliptical in cross section.

7. A method according to claim 1, wherein said outer surface is generally rectangular in cross section.

8. A method according to claim 7, wherein said rectangular cross section has convex surfaces.

9. For use in a laser having an elongate solid active laser element requiring to be cooled:

a jacket for surrounding said element to define with an outer surface thereof an elongate annular space of substantially uniform radial extent for confining a flow of a coolant in contact with said outer surface, said jacket having at least one pair of ports for respectively introducing coolant into said space in a direction substantially parallel to or tangential to a part of said surface and receiving coolant from said space in a direction substantially parallel to or tangential to a further part of said surface, said ports being displaced from each other in the longitudinal direction of the space to cause the coolant to travel between them in at least one helical flow.

10. The jacket of claim 9 having at least two said pairs of ports with each port displaced from each other port in said longitudinal direction.

11. A laser having a solid elongate active laser element requiring to be cooled; and a jacket surrounding said element to define with an outer surface of said element an elongate annular space of substantially uniform radial extent for confining a flow of a coolant in contact with said outer surface;

said jacket having at least one pair of ports for respectively introducing coolant into said space in a direction substantially parallel to or tangential to a part of said surface and receiving coolant from said space in a direction substantially parallel to or tangential to a further part of said surface, said ports being displaced from each other in the longitudinal direction of the space to cause the coolant to travel between them in at least one helical flow.

12. A laser according to claim 11, wherein said jacket has at least two said pairs of ports with each port displaced from each other port in said longitudinal direction.

13. A laser according to claim 12, including means for introducing coolant into one port of each of said pairs of ports and receiving coolant from the other one of each of said pairs of ports, the locations of the ports being such that the coolant travels therebetween in helical flows having longitudinal components extending along the space in directions opposite to each other.

14. For use in a laser having an elongate solid active laser element requiring to be cooled:

a jacket for surrounding said element to define with an outer surface thereof an elongate annular space of substantially uniform radial extent for confining a flow of a coolant in contact with said outer surface, said jacket having at least one pair of input and output ports for respectively introducing coolant into said space in a direction substantially parallel to or tangential to a part of said surface and receiving coolant from said space, said ports being displaced from each other in the longitudinal direction of the space to cause the coolant to travel between them in at least one helical flow.

15. A laser having a solid elongate active laser element requiring to be cooled; and a jacket surrounding said element to define with an outer surface of said element an elongate annular space of substantially uniform radial extent for confining a flow of a coolant in contact with said outer surface;

said jacket having at least one pair of input and output ports for respectively introducing coolant into said space in a direction substantially parallel to or tangential to a part of said surface and receiving coolant from said space, said ports being displaced from each other in the longitudinal direction of the space to cause the coolant to travel between them in at least one helical flow.

\* \* \* \* \*